United States Patent
Miyazaki et al.

(10) Patent No.: US 11,219,861 B2
(45) Date of Patent: Jan. 11, 2022

(54) ELECTRODEIONTZATION APPARATUS

(71) Applicant: KURITA WATER INDUSTRIES LTD., Tokyo (JP)

(72) Inventors: Yoichi Miyazaki, Tokyo (JP); Yuichiro Wada, Tokyo (JP); Kouichi Nagata, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 383 days.

(21) Appl. No.: 16/332,493

(22) PCT Filed: Mar. 9, 2017

(86) PCT No.: PCT/JP2017/009425
§ 371 (c)(1),
(2) Date: Mar. 12, 2019

(87) PCT Pub. No.: WO2018/070065
PCT Pub. Date: Apr. 19, 2018

(65) Prior Publication Data
US 2019/0232229 A1   Aug. 1, 2019

(30) Foreign Application Priority Data
Oct. 12, 2016   (JP) .............................. JP2016-201339

(51) Int. Cl.
*B01D 61/48* (2006.01)
*C02F 1/469* (2006.01)

(52) U.S. Cl.
CPC ............ *B01D 61/48* (2013.01); *C02F 1/4695* (2013.01); *B01D 2313/10* (2013.01); *B01D 2313/12* (2013.01); *Y02A 20/124* (2018.01)

(58) Field of Classification Search
CPC ..................................................... C02F 1/4695
See application file for complete search history.

(56) References Cited

U.S. PATENT DOCUMENTS 5,292,422 A * 3/1994 Liang ..................... B01D 61/48
204/632

FOREIGN PATENT DOCUMENTS

JP   S62-170106 U   10/1987
JP   H01-114003 U    8/1989
(Continued)

OTHER PUBLICATIONS

International Search Report dated Apr. 4, 2017 issued in corresponding international patent application No. PCT/JP2017/009425 (and English translation).

*Primary Examiner* — Salil Jain
(74) *Attorney, Agent, or Firm* — Posz Law Group, PLC

(57) ABSTRACT

Inflow branch pipes of water to be treated, which are branched from an inflow line of the water to be treated, which is provided on an upper side of desalination chambers of an electrodeionization apparatus, communicate with the desalination chambers, respectively. Both ends of the inflow line of the water to be treated are opened, and a supply pipe of the water to be treated communicates with each of the ends so that the water to be treated can be supplied from both sides. In addition, in a lower side of each of the desalination chambers, outflow pipes of treated water, communicate with each other, and these outflow pipes each join an outflow line of the treated water. In addition, both ends of the outflow line of the water to be treated are opened so that the treated water can be discharged from both sides. According to such an electrodeionization apparatus, it is possible to suppress an increase in a differential pressure during passage of water.

1 Claim, 4 Drawing Sheets

(56) References Cited

FOREIGN PATENT DOCUMENTS

| | | | |
|---|---|---|---|
| JP | 2001-321774 A | | 11/2001 |
| JP | 2013-034920 A | | 2/2013 |
| JP | 2013034920 A | * | 2/2013 |
| JP | 2016-150304 A | | 8/2016 |
| WO | 2011/016477 A1 | | 2/2011 |
| WO | 2016/133041 A1 | | 8/2016 |

* cited by examiner

ELECTRODEIONTZATION APPARATUS

CROSS REFERENCE TO RELATED APPLICATIONS

This application is a U.S. national stage application of PCT/JP2017/009425 filed on Mar. 9, 2017 and is based on Japanese Patent Application No. 2016-201339 filed on Oct. 12, 2016, the contents of which are incorporated herein by reference.

TECHNICAL FIELD

The present invention relates to an electrodeionization apparatus, and particularly relates to an electrodeionization apparatus which can suppress a differential pressure during passage of water.

BACKGROUND ART

The electrodeionization apparatus is configured to produce deionized water by charging a chamber formed by a cation exchange membrane and an anion exchange membrane with an ion exchange resin to form a desalination chamber, passing water to be treated through the desalination chamber, also making a direct current flow in the water through both of the above described ion exchange membranes, and electrically excluding ions in the water to be treated into concentrating water which flows outside both of the ion exchange membranes.

When the water to be treated is passed through the desalination chamber of the electrodeionization apparatus, impurity ions in the water to be treated are adsorbed by the ion exchange resin in the desalination chamber, and thereby highly desalinated pure water is produced. On the other hand, the impurity ions are adsorbed to the ion exchange resin in the desalination chamber, but the ions move to the concentrating chamber by the direct current being passed, and accordingly the ion exchange resin is continuously regenerated.

FIG. 5 shows such a conventional electrodeionization apparatus. In the electrodeionization apparatus 1 shown in FIG. 5, a plurality of cation exchange membranes 2 and anion exchange membranes 3 are alternately arranged while being separated from each other, the spaces formed by the cation exchange membranes 2 and the anion exchange membranes 3 are charged with the ion exchange resins 4, respectively, and thereby a plurality of desalination chambers 5 and concentrating chambers 6 for flowing the concentrating water therethrough are alternately formed. In FIG. 5, the ion exchange resin 4, with which the concentrating chamber 6 is charged, is omitted for the sake of convenience. This concentrating chamber 6 receives ions which move from the desalination chamber 5 through each of the ion exchange membranes, and discharges the ions. In addition, the desalination chambers 5 and the concentrating chambers 6 are arranged between an anode 7 and a cathode 8, and an anode chamber 9 and a cathode chamber 10 are formed in the inner sides of the anode 7 and the cathode 8, respectively. The anode chamber 9 and the cathode chamber 10 are usually partitioned by the cation exchange membrane or the anion exchange membrane.

In this electrodeionization apparatus 1, an inflow line 11 of water W to be treated is provided on the upper side in the drawing of each of the desalination chambers 5. The inflow line 11 is opened in the base end side, and the inflow line 11 has inflow branch pipes 11A, 11B, 11C and 11D of the water to be treated, which are sequentially branched and communicate with the desalination chambers 5, respectively. On the other hand, in the lower side in the drawing of each of the desalination chambers 5, outflow pipes 12A, 12B, 12C and so on, of the treated water W1, communicate with each other, and these outflow pipes 12A, 12B and 12C join an outflow line 12 of the treated water W1 and are opened in one side of the outflow line 12.

In addition, in the lower side in the drawing of each of the concentrating chambers 6, an inflow line 13 of the concentrating water W2 is provided, and inflow branch pipes of the concentrating water, which are sequentially branched from the base end side of this inflow line 13, communicate with the concentrating chambers 6, respectively. On the other hand, on the upper side in the drawing of each of the concentrating chambers 6, discharge pipes for the concentrating water communicate with each other, and these discharge pipes each join a discharge line 14 of the concentrated effluent water W3 and are opened on the other side of the discharge line 14. Incidentally, reference numerals 15 and 16 denote an inflow line of and a discharge line for electrode water W4, respectively.

In the above described electrodeionization apparatus 1, a direct current is passed between the anode 7 and the cathode 8, the water W to be treated is passed into each of the desalination chambers 5 from the inflow line 11 of the water to be treated, also the concentrating water W2 is passed into each of the concentrating chambers 6 from the inflow line 13 of the concentrating water, and electrode water W4 is passed from the inflow lines 15 of the electrode water into the anode chamber 9 and the cathode chamber 10, respectively. The water W to be treated which has flowed in from the inflow line 11 of the water to be treated flows down to the desalination chamber 5, and ions to be removed move to the concentrating chamber 6 through the anion exchange membrane 3 and the cation exchange membrane 2 on both sides. On the other hand, the concentrating water W2 which has flowed from the inflow line 13 of the concentrating water moves up in each of the concentrating chambers 6, and receives impurity ions which move through the cation exchange membrane 2 and the anion exchange membrane 3 and come therein. Concentrated effluent water W3 which has concentrated the impurity ions flows out from the outflow line 14 of the concentrating water, and the electrode water W4 which has flowed in from the inflow line 15 of the electrode water flows out from the outflow line 16 of the electrode water. Then, the treated water W1 which has been treated in the desalination chamber 5 is obtained through the outflow line 12 of deionized water, as desalinated water.

SUMMARY OF THE INVENTION

Problems to be Solved by the Invention

However, in this conventional electrodeionization apparatus, the water W to be treated flows from the base end side of the inflow line 11 sequentially to the respective desalination chambers 5 via the inflow branch pipes 11A, 11B, 11C and so on, of the water to be treated, and accordingly as the water flows from the base end side toward the terminal end side, the pressure of the water which flows into the branch pipes 11A, 11B and 11C decreases in this order, and accordingly the differential pressure of passing water in the electrodeionization apparatus itself increases. In addition, when the differential pressure of the passing water increases, it is obliged to increase the pressure of a supply pump for supplying the water W to be treated, in order to obtain a stable amount of treated water W1, and accordingly there are problems that not only electric power consumption increases but also a risk of water leakage from the electrodeionization apparatus increases.

The present invention is designed with respect to the above described problems, and an object thereof is to provide an electrodeionization apparatus which can suppress an increase in a differential pressure during passage of water.

Means for Solving the Problems

In order to attain the above described object, the present invention provides an electrodeionization apparatus comprising: a cathode and an anode; a plurality of cation exchange membranes and anion exchange membranes arranged between the cathode and the anode; a plurality of desalination chambers and concentrating chambers which are partitioned by the cation exchange membranes and the anion exchange membranes, wherein the desalination chambers and the concentrating chambers are filled with an ion exchange resin; and means for passing water to be treated through the plurality of desalination chambers to extract deionized water, and means for passing concentrating water, which passes the concentrating water to the concentrating chamber, wherein each of inflow branch pipes of the water to be treated, which are sequentially branched from an inflow line of the water to be treated, communicate with one side of each of the desalination chambers, and each of outflow pipes of treated water communicates with the other side of each of the desalination chambers, and each of these outflow pipes joins an outflow line of the treated water, wherein both sides of the inflow line are opened, and the water to be treated is supplied from both sides of the inflow line (Invention 1).

According to the invention (Invention 1), when the water to be treated is supplied from the inflow line of the water to be treated in the electrodeionization apparatus, the water to be treated flows to each of the desalination chambers through the inflow branch pipes of the water to be treated, which are sequentially branched from the inflow line of the water to be treated. At this time, a difference occurs in a supply pressure of the water to be treated between a desalination chamber near to a supply side of the water to be treated of the inflow line and a desalination chamber distant from the supply side, and this difference has been a factor of the differential pressure during the passage of water. Then, the water to be treated shall be supplied from both sides of the inflow line of the water to be treated; thereby the total distance between each of the desalination chambers and the supply side can be reduced to approximately ½; and the increase of the differential pressure during the passage of water can be suppressed.

In the invention (Invention 1), it is preferable that both sides of the outflow line are opened, and the treated water flows out from both sides of the outflow line (invention 2).

According to the invention (Invention 2), the treated water which has passed through each of the desalination chambers is discharged from both sides of the outflow line, thereby the differential pressure incident to the outflow is alleviated, and thereby an increase in the differential pressure of the water to be treated during the passage of water is further suppressed, which is supplied to the desalination chamber of the electrodeionization apparatus.

In the invention (Invention 2), it is preferable that the outflow line has a partition structure in a central part thereof (Invention 3).

According to the invention (Invention 3), when the treated water which has passed through each of the desalination chambers is discharged from both sides of the inflow line of the water to be treated, the treated water is divided into both sides of the outflow line, because the outflow line has the partition structure in the central part thereof, and accordingly the differential pressure incident to the outflow is further alleviated.

Effect of the Invention

The electrodeionization apparatus of the present invention can suppress the increase in the differential pressure during the passage of water, by supplying the water to be treated from both sides of the inflow line of the water to be treated in the electrodeionization apparatus. Thereby, the electrodeionization apparatus can stabilize the operation of the electrodeionization apparatus, reduce a risk of water leakage, and improve also the durability of the apparatus.

EMBODIMENTS FOR CARRYING OUT THE INVENTION

Hereinafter, an electrodeionization apparatus according to an embodiment of the present invention will be described with reference to the attached drawings.

Figure 1:
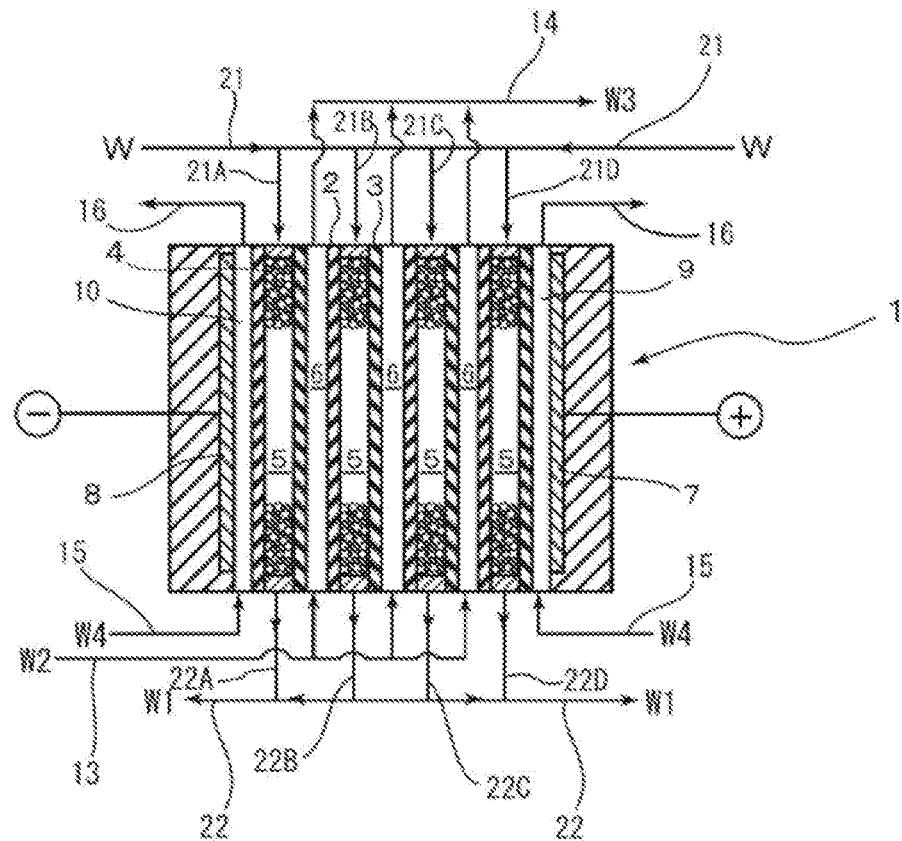
FIG. 1 is a schematic diagram showing a configuration of an electrodeionization apparatus according to a first embodiment of the present invention.
Figure 2:
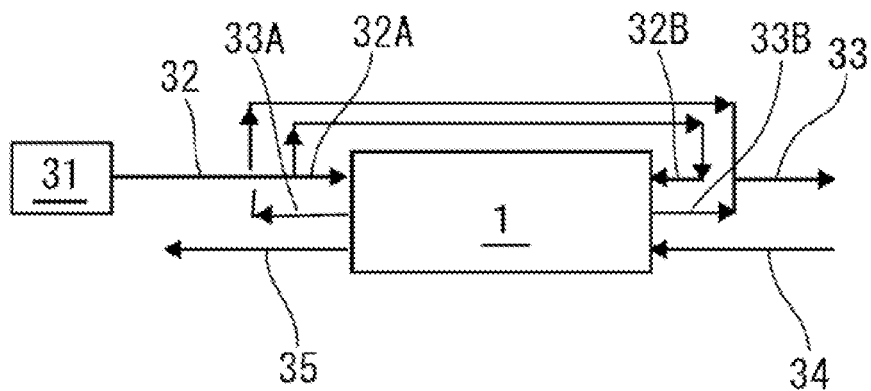
FIG. 2 is a distribution diagram showing a configuration of the electrodeionization apparatus according to the first embodiment.
Figure 5:
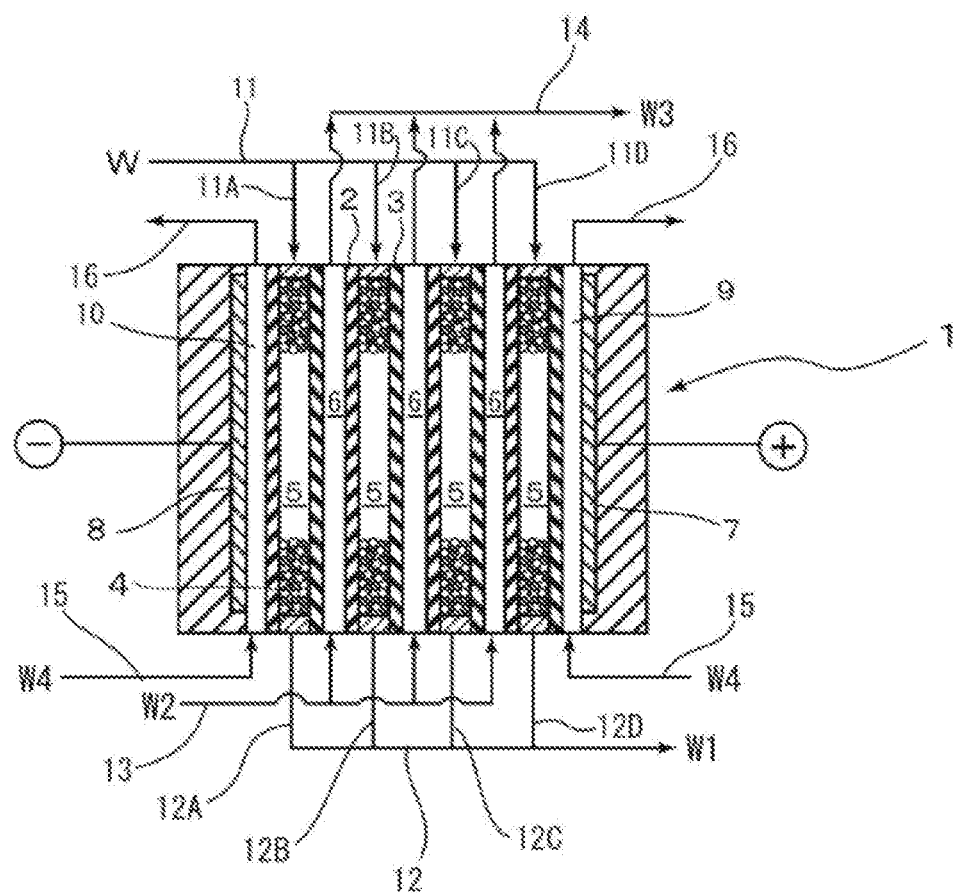
FIG. 5 is a schematic diagram showing a conventional electrodeionization apparatus.

FIG. 1 and FIG. 2 show the configuration of the electrodeionization apparatus according to the first embodiment of the present invention; and the same components as those in the electrodeionization apparatus of the conventional example shown in FIG. 5 are denoted by the same reference numerals, and a detailed description thereof will be omitted. In the electrodeionization apparatus 1 shown in FIG. 1, an inflow line 21 of the water W to be treated is provided on the upper side in the drawing of each of the desalination chambers 5, and the inflow branch pipes 21A, 21B, 21C, 21D and so on, of the water to be treated, which are branched on the way of the inflow line 21, communicate with the desalination chambers 5, respectively. Both ends of the inflow line 21 of the water W to be treated are opened, and a supply pipe (not shown) of the water to be treated communicate with each of the ends so that the water W to be treated can be supplied from both sides. In addition, in the lower side in the drawing of each of the desalination chambers 5, outflow pipes 22A, 22B, 22C, 22D and so on, of treated water W1, communicate with each other, and these outflow pipes 22A, 22B and 22C join an outflow line 22 of the treated water W1 which is deionized water. In addition, in the present embodiment, both ends of the outflow line 22 of the water W to be treated are opened so that the treated water W1 can be discharged from both sides.

As shown in FIG. 2, in this electrodeionization apparatus 1, an inflow line (not shown) is provided of which both ends are opened from one side of the upper part of the electrodeionization apparatus 1 to the other side, a supply pipe 32 of the water to be treated is branched, which communicates with a supply source 31 of the water to be treated, and these branched supply pipes 32A and 32B of the water to be treated are connected to both ends of the inflow line; and on the other hand, an outflow line (not shown) is provided of which both ends are opened from one side of the lower part of the electrodeionization apparatus 1 to the other side, delivery pipes 33A and 33B for the treated water are connected to both sides of the outflow line, respectively, and the delivery pipes 33A and 33B are joined together to constitute a delivery pipe 33 for the treated water. Incidentally, reference numerals 34 and 35 denote a supply pipe of concentrating water and a discharge pipe for concentrating water, which are connected respectively to the supply line of the concentrating water W2 and the outflow line of the concentrated effluent water W3, which are not shown.

In such an electrodeionization apparatus 1, the ratio of the anion exchange resin to the cation exchange resin of the ion exchange resin 4, with which the desalination chamber 5 is charged, is not limited in particular, but is preferably 80:20 to 60:40 by volume ratio, and is particularly preferably 80:20 to 70:30. Incidentally, the ratio of the ion exchange resin may be different between the upper side (inlet side) and the lower side (outlet side) of the desalination chamber 7, and in this case, it is preferable to make the ratio of the anion exchange resin on the upper side (inlet side) higher in a range of the above described ratio.

In addition, the ratio between the anion exchange resin and the cation exchange resin of the ion exchange resin 4, with which the concentrating chamber 6 is charged, is not limited in particular; and it is preferable to make both of them equal to each other or make the cation exchange resin many to some extent, and it is acceptable to set the ratio of the anion exchange resin to the cation exchange resin at 60:40 to 50:50 by volume ratio.

As for the ion exchange resin 4 with which the desalination chamber 7 and the concentrating chamber 6 are charged, a resin can be suitably used which has been subjected to conditioning such as a cleaning step by an acid or an alkali, an acid extrusion step by ultrapure water, a hot water cleaning step by hot ultrapure water, and a finishing step by ultrapure water.

A method for producing deionized water using the electrodeionization apparatus 1 as described above will be described below. In the production of the deionized water, firstly a direct current is passed between the anode 7 and the cathode 8, and the water W to be treated is supplied to the supply pipe 32 of the water to be treated from the supply source 31 of the water to be treated; then the water W to be treated is supplied from both sides of the inflow line 21 of the electrodeionization apparatus 1 via the supply pipes 32A and 32B of the water to be treated, and flows into each of the desalination chambers 5 from the inflow line 21 through the inflow branch pipes 21A, 21B, 21C and so on, of the water to be treated. On the other hand, the concentrating water W2 is passed into each of the concentrating chambers 6 from the inflow line 13 of the concentrating water, and electrode water W4 is passed into the anode chamber 9 and the cathode chamber 10 from inflow lines 15 and 15 of electrode water, respectively. The water W to be treated which has flowed in flows down in the desalination chamber 5, and ions to be removed migrate to the concentrating chamber 6 through the anion exchange membrane 3 and the cation exchange membrane 2 which are provided on both sides. Then the concentrating water W2 which has flowed in from the inflow line 13 of the concentrating water moves up in each of the concentrating chambers 6, and receives impurity ions which move in through the cation exchange membrane 2 and the anion exchange membrane 3; and concentrated effluent water W3 which has concentrated impurity ions is discharged from an outflow line 14 of the concentrating water, and furthermore, the electrode water W4 which has flowed in from an inflow line 15 of the electrode water flows out from an outflow line 16 of the electrode water.

Treated water W1 which has been thus treated in the desalination chamber 5 flows out as deionized water from the outflow pipes 22A, 22B, 22C and so on, of the treated water W1, joins at the outflow line 22, and is sent out. At this time, in the present embodiment, delivery pipes 33A and 33B for the treated water are connected to both sides of the outflow line 22, respectively, and accordingly the treated water (deionized water) W1 flows out from the two directions of the outflow line 22, joins the delivery pipe 33 through the delivery pipes 33A and 33B, and flows out to the outside of the apparatus.

As described above, the electrodeionization apparatus 1 supplies the water W to be treated from both sides of the inflow line 21 of the water to be treated, thereby can reduce a total distance between the supply side and each of the desalination chambers 5 to approximately ½ as compared with the case where the water to be treated is supplied from one side, accordingly can alleviate the difference in the supply pressure of the water W to be treated between each of the desalination chambers 5, which originates in the pressure loss at the time when the water passes through the inflow line 21, and can suppress the increase in the differential pressure during the passage of water. In particular, in the present embodiment, the electrodeionization apparatus 1 is configured to make the treated water W1 which has passed through each of the desalination chambers 5 flow out from both sides of the outflow line 22 of the treated water, thereby to alleviate the differential pressure incident to the outflow, and thereby to be capable of further suppressing the increase in the differential pressure during the passage of the water W1 to be treated which is supplied to the desalination chamber 5 thereof.

Figure 3:
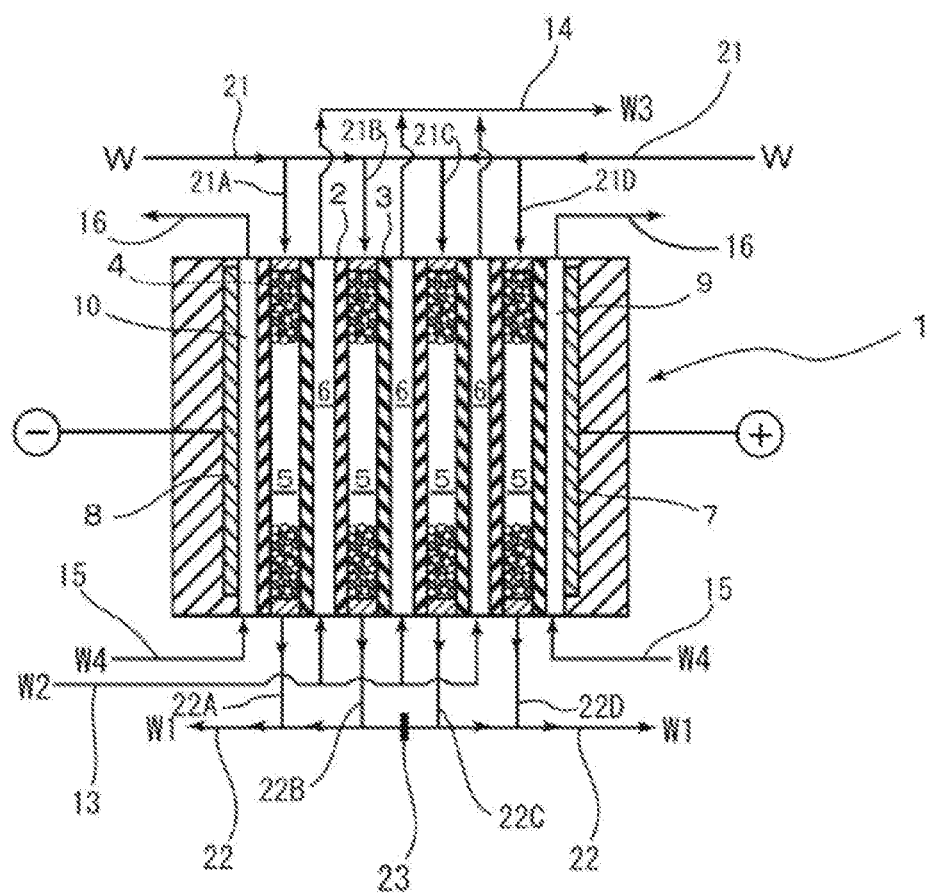
FIG. 3 is a schematic diagram showing a configuration of an electrodeionization apparatus according to a second embodiment of the present invention.

Next, an electrodeionization apparatus according to a second embodiment of the present invention will be described with reference to FIG. 3. The electrodeionization apparatus of the present embodiment has the same configuration as the electrodeionization apparatus of the first embodiment, except having a partition member in the central part of the outflow line 22 as a partition structure.

By adopting the configuration of the present embodiment, the flow of the treated water W1 is completely divided into the right side and the left side of the partition member 23, when the treated water (deionized water) W1 which has been treated in the desalination chamber 5 flows out from the outflow pipes 22A, 22B, 22C and so on, of the treated water W1, and accordingly it becomes possible to further alleviate the differential pressure incident to the outflow.

In the above description, the electrodeionization apparatus of the present invention has been described with reference to the attached drawings, but the present invention is not limited to the above described embodiments, and various modifications can be made. For example, the flowing direction of the concentrating water W2 may be the same as the direction of the water W to be treated, and in addition, the water W1 to be treated may be batched off and be distributed.

EXAMPLES

Hereinafter, the present invention will be described more specifically with reference to examples and comparative examples, but the present invention is not limited to the following examples.

Example 1

VNX (made by Evoqua Water Technologies Corp.) was used as an electrodeionization apparatus 1 which becomes the base; and the supply pipes 32A and 32B of the water to be treated were connected to both ends of the inflow line 21 as shown in FIG. 1 and FIG. 2, and delivery pipes 33A and 33B for the treated water were connected to both ends of the outflow line 22 to constitute the electrodeionization apparatus 1 of Embodiment 1. Incidentally, the electrodeionization apparatus 1 used in Example 1 has such a configuration as to have four desalination chambers 5 and three concentrating chambers 6.

Pressures in the outflow line 22 were measured at the time when the water W to be treated was passed through the electrodeionization apparatus 1 at 7.5 m$^3$/h, 10.5 m$^3$/h, 12.5 m$^3$/h and 15.0 m$^3$/h, and the pressure losses (differential pressure) with respect to the pressures of passing water were measured. The results are shown in FIG. 4.

Comparative Example 1

Pressures in the outflow line 11 were measured at the time when the water W to be treated was passed through the conventional electrodeionization apparatus in FIG. 5 at 7.5 m$^3$/h, 10.5 m$^3$/h, 12.5 m$^3$/h and 15.0 m$^3$/h, and the pressure losses (differential pressure) with respect to the pressures of passing water were measured. The results are shown together in FIG. 4.

Figure 4:
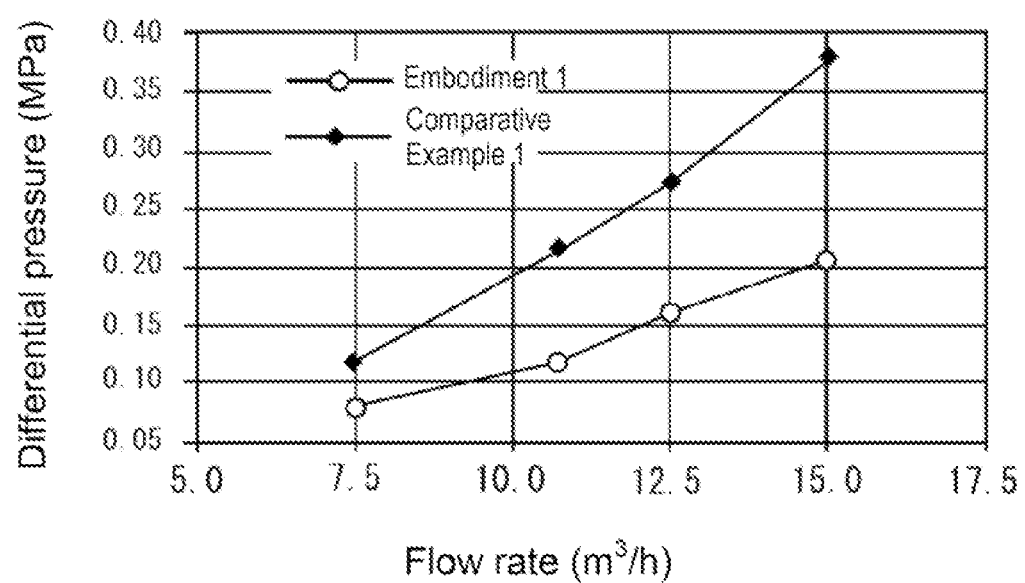
FIG. 4 is a graph showing flow rates and pressure losses in both electrodeionization apparatuses of Example 1 and Comparative Example 1.

As is clear from FIG. 4, in the electrodeionization apparatus of Example 1, the differential pressure is reduced by approximately 40%, compared to the electrodeionization apparatus of Comparative Example 1 in which the water W to be treated was passed from one side and was made to flow out, and it is understood that it is possible to suppress an increase in the differential pressure during the passage of water.

DESCRIPTION OF REFERENCE NUMERALS

1 Electrodeionization apparatus
1 Cation exchange membrane
3 Anion exchange membrane
4 Ion exchange resin
5 Desalination chamber
6 Concentrating chamber
7 Anode
8 Cathode
9 Anode chamber
10 Cathode chamber
21 Inflow line
21A, 21B, 21C, 21D Inflow branch pipe of water to be treated
22 Outflow line
22A, 22B, 22C, 22D Outflow pipe
23 Partition member
31 Supply source of water to be treated
32 Supply pipe of water to be treated
33 Delivery pipe for treated water
34 Supply pipe of concentrating water
35 Outflow pipe for concentrating water
W Water to be treated
W1 Treated water (deionized water)
W2 Concentrating water
W3 Concentrated effluent water
W4 Electrode water

The invention claimed is:

1. An electrodeionization apparatus comprising:
   a cathode and an anode;
   a plurality of cation exchange membranes and a plurality of anion exchange membranes arranged between the cathode and the anode;
   a plurality of desalination chambers and a plurality of concentrating chambers which are defined by the plurality of cation exchange membranes and the plurality of anion exchange membranes, wherein the desalination chambers and the concentrating chambers are filled with an ion exchange resin; and
   means for passing water to be treated through the plurality of desalination chambers to extract deionized water, and means for passing concentrating water, which passes the concentrating water to the plurality of concentrating chambers, wherein
   each of inflow branch pipes of the water to be treated, which are sequentially branched from an inflow line of the water to be treated, communicates with one side of each of the desalination chambers, and each of outflow pipes of treated water communicates with the other side of each of the desalination chambers, and each of these outflow pipes joins an outflow line of the treated water, wherein both sides of the inflow line are opened, the water to be treated is supplied from both sides of the inflow line, the treated water flows out from both sides of the outflow line, and the outflow line has a partition structure in a central part thereof.

* * * * *